United States Patent [19]

Kramer et al.

[11] 4,368,822
[45] Jan. 18, 1983

[54] MATERIAL HANDLING METHOD AND APPARATUS

[75] Inventors: Joseph O. Kramer; Otto V. Young, both of Toledo; Charles E. Banner; John D. Schuster, both of Sylvania, all of Ohio

[73] Assignee: Libbey-Owens-Ford Company, Toledo, Ohio

[21] Appl. No.: 270,154

[22] Filed: Jun. 3, 1981

Related U.S. Application Data

[62] Division of Ser. No. 121,795, Feb. 15, 1980, Pat. No. 4,320,826.

[51] Int. Cl.³ .............................................. A47F 7/00
[52] U.S. Cl. ..................................... 211/41; 206/448
[58] Field of Search ................. 211/41; 206/448, 453, 206/454, 455, 456

[56] References Cited

U.S. PATENT DOCUMENTS

| 2,946,453 | 7/1960 | Pityo | 211/41 |
| 3,781,003 | 12/1973 | DeAngelis | 211/41 X |
| 4,033,597 | 7/1977 | Boyer | 211/41 X |
| 4,093,251 | 6/1978 | Boyer | 211/41 X |

Primary Examiner—James T. McCall
Assistant Examiner—Robert W. Gibson, Jr.
Attorney, Agent, or Firm—Collins, Oberlin & Darr

[57] ABSTRACT

A method of and apparatus for handling sheet material including a peg conveyor for supporting and advancing a plurality of spaced, generally upright sheet articles in combination with a rack having spaced pegs and carried on a mobile lift apparatus for stripping the articles from said conveyor onto said rack or for depositing sheet-like articles from a loaded rack onto a conveyor or other article support system.

5 Claims, 17 Drawing Figures

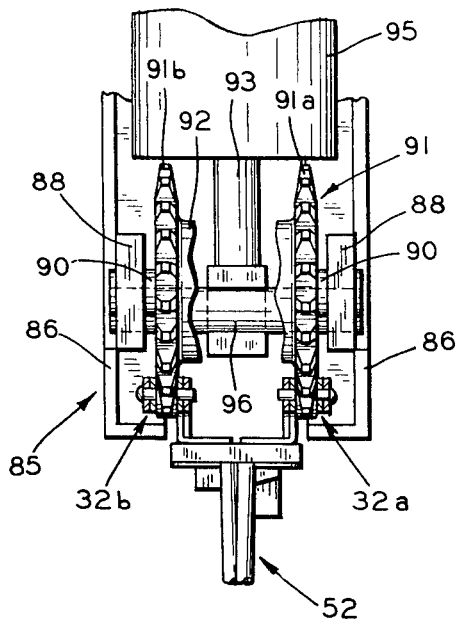
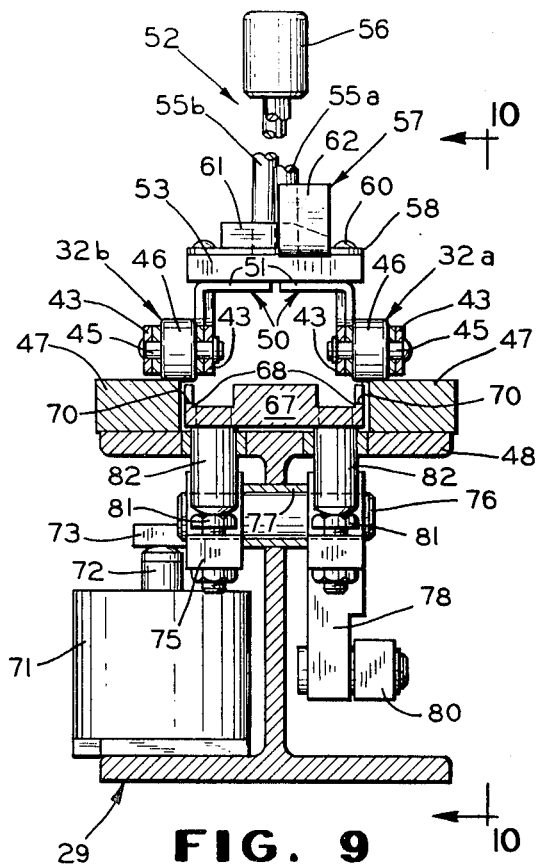
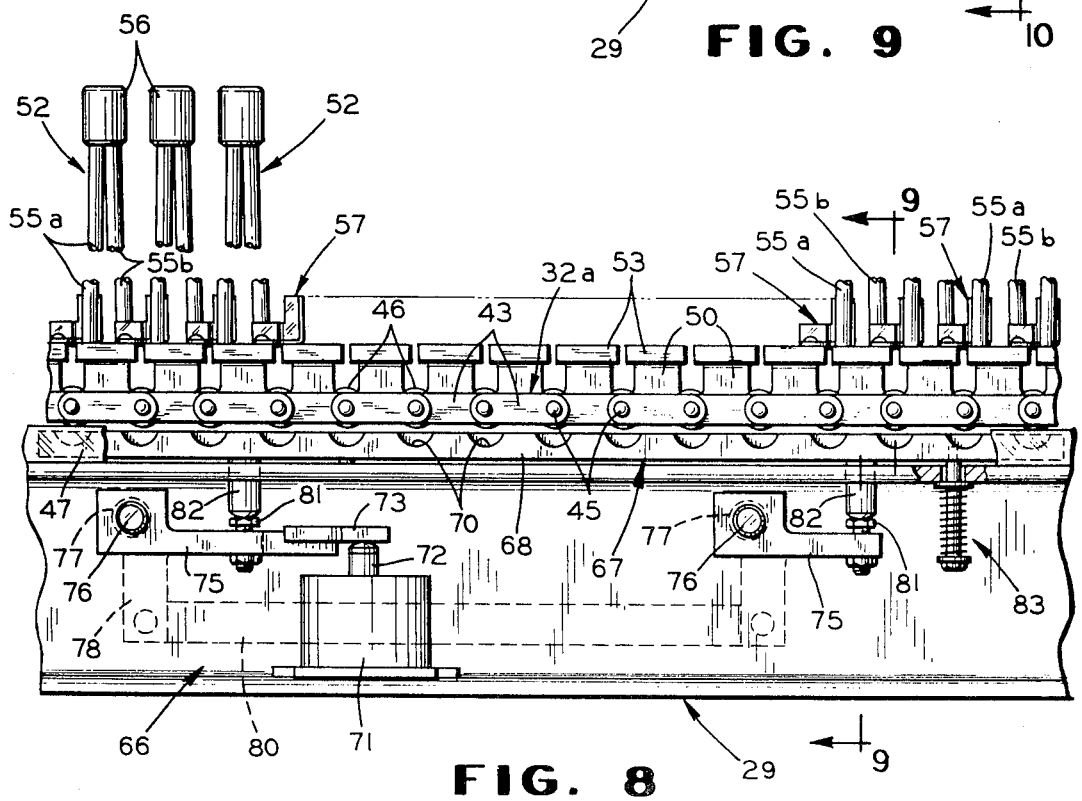
FIG. 7
FIG. 9
FIG. 8

MATERIAL HANDLING METHOD AND APPARATUS

This is a division of application Ser. No. 121,795, filed Feb. 15, 1980, now U.S. Pat. No. 4,320,826.

BACKGROUND OF THE INVENTION

This invention relates generally to the material handling art and, more particularly, to a method of and apparatus for handling glass sheet articles, such as automotive windshields for example.

In the production of glass products, such as present day automotive windshields for example, it is common practice to store and transport such windshields on racks between the various fabricating stages such as the pattern scoring, glass breaking-out, edge finishing, bending and tempering, and laminating operations for example. Much of the transfer of the glass sheets between the racks and the production line of the particular phase of production being conducted is done manually, usually by at least two attendants at each station who remove the sheets from the racks at the loading end of a particular line operation and another pair of attendants at the unloading end thereof to remove the processed glass sheets from the production line onto other racks. It can be readily appreciated that such manual operations seriously impair efficiency and productivity in a mass production operation, and thereby increase production costs. Also, the attendant fatigue in performing such arduous tasks often results in careless glass handling with consequent scratching, chipping or breaking of the glass products, further encumbering production and adding materially to production costs.

SUMMARY OF THE INVENTION

Accordingly, it is a primary object of the present invention to obviate the above-noted shortcomings by providing a new and useful method of and apparatus for automatically handling sheet products rapidly, smoothly, and with the precision essential in an automated glass fabrication process.

Another object of this invention is to provide a new and useful storage rack for stripping or depositing a plurality of sheet products simultaneously from or onto a support system, such as a conveyor for example.

Still another object of the present invention is to provide on the foregoing rack a plurality of spaced rows of specially constructed peg assemblies for supporting a plurality of sheets in an upright, spaced relation.

Yet another object of this invention is to provide a new and improved peg conveyor for receiving and accumulating a series of sheet articles thereon for subsequent removal.

A further object of this invention is to employ the foregoing storage rack in combination with the above mentioned accumulating transfer conveyor to transfer a series of sheet products simultaneously therebetween.

Still a further object of the present invention is to provide in the foregoing combination means for precisely orienting the rack and accumulating conveyor relative to each other in order to effect the article transfer.

The foregoing and other objects, advantages, and characterizing features of the present invention will become clearly apparent from the ensuing detailed description thereof considered in conjunction with the accompanying drawings wherein like reference characters denote like parts throughout the various views.

BRIEF DESCRIPTION OF THE DRAWINGS

FIG. 7 is a fragmentary, end elevational view, looking in the direction of arrows 7—7 of FIG. 5, of a chain relaxing means used in conjunction with this invention;

FIG. 8 is a fragmentary, side elevational view of the accumulating transfer conveyor of this invention, looking at the outer face of one side thereof;

FIG. 9 is a vertical sectional view, on an enlarged scale, taken along line 9—9 of FIG. 8;

DESCRIPTION OF THE PREFERRED EMBODIMENT

Figure 1:
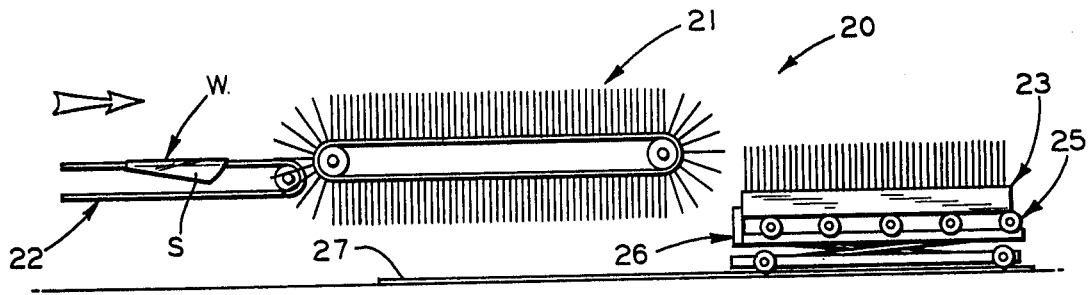
FIGS. 1 to 4 are schematic views illustrating the material handling apparatus of this invention, and which includes an accumulating conveyor and rack arrangement shown in various relative operational positions.
Figure 2:
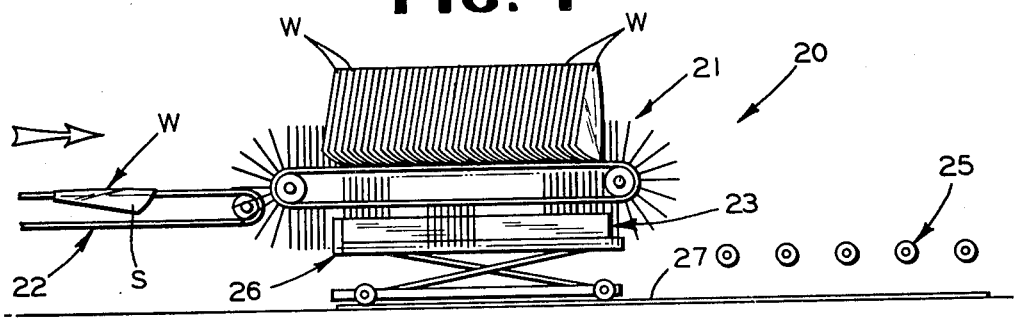
Figure 3:
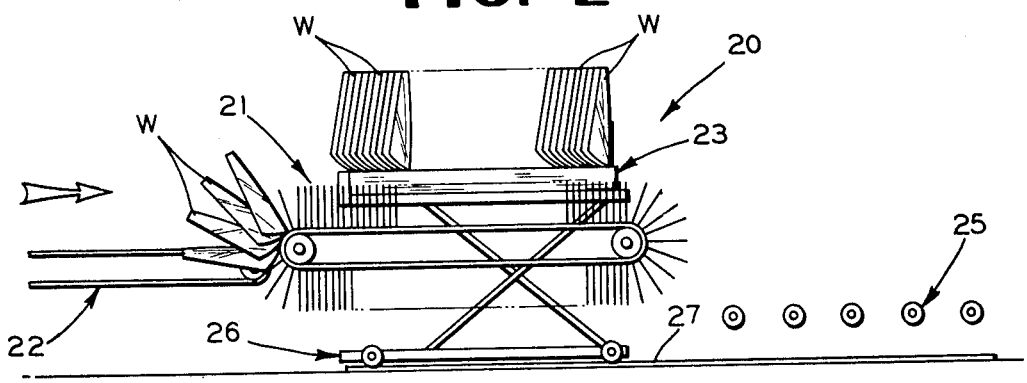
Figure 4:
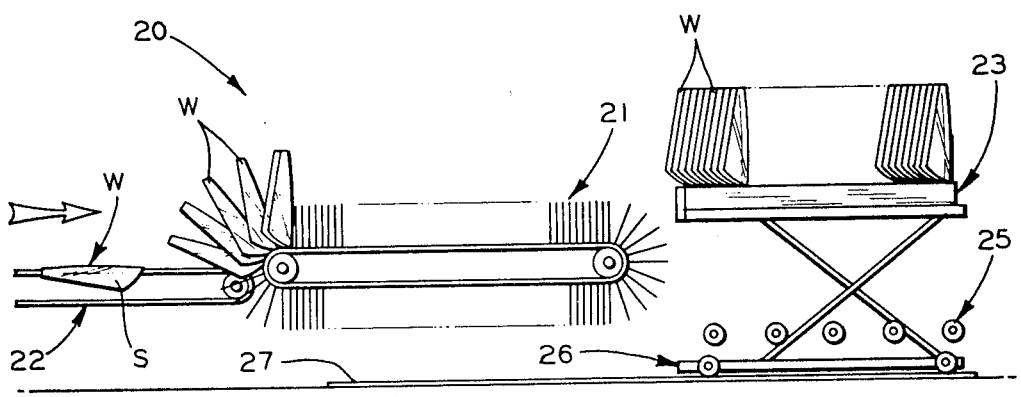

Referring now in detail to the illustrative embodiment depicted in the accompanying drawings, there is shown schematically in FIGS. 1-4 a sheet handling apparatus, comprehensively designated 20, especially adapted for use in handling paired sheets of glass, such as are utilized in the formation of automotive windshields and the like. The apparatus 20 includes an accumulating transfer conveyor, generally designated 21 and hereinafter often referred to as a "peg" conveyor, adapted to receive paired sheets of bent or curved glass as a unit, identified as W, from an input or delivery conveyor 22 and to advance the same along conveyor 21 until a predetermined number of such units W have been accumulated thereon. The conveyor 21 is then indexed to shift the accumulated units W rearwardly to a given position and is momentarily stopped at such position. In the meantime, an empty rack, generally designated 23, is advanced by a run-in conveyor 25 into position above a mobile lift apparatus 26. The apparatus 26 is operative to lift the empty rack 23 off conveyor 25 to a position slightly thereabove and then move longitudinally along tracks 27 to advance the rack 23 to a precise position beneath the active run of conveyor 21. The rack 23 is then raised by apparatus 26 to strip or lift the accumulated glass units W off conveyor 21 to an elevated position thereabove. The mobile lift apparatus 26 is then returned via tracks 27 to its initial starting position, carrying the loaded rack 23 therewith. Apparatus 26 is then actuated to lower the loaded rack 23 onto conveyor 25, which can be driven in a reverse direction to convey or otherwise remove the glass laden rack 23 to another station for storage or for unloading onto a further glass processing station.

While the apparatus 20 of this invention is particularly suited for handling paired sheets of glass, such as the complementary inboard and outboard sheets of a windshield for example, it should be understood that apparatus 20 is in no way restricted thereto, but has utility in handling single sheets of glass or any other somewhat rigid sheet material.

Referring now to FIGS. 5-11, the accumulating transfer conveyor 21 comprising a base frame 28 including a pair of longitudinally extending, transversely spaced beam members 29 extending substantially the length of the conveyor 21 and suitably supported on upright posts or legs 30. A structural cross member 31 extends between and is rigidly secured at its opposite ends to the beam members 29 at one end of conveyor 21 while the other end of the conveyor is left open to permit passage of the mobile lift apparatus 26 and rack 23 thereinto between the beams 29. Conveyor 21 includes a pair of laterally spaced, endless drive chain assemblies 32 located along the opposite sides of conveyor 21 and entrained about laterally spaced drive sprockets 33 located at one end of the frame and idler sprockets 35 disposed at the other end of the frame 28. The drive sprockets 33 are rigidly secured to a common drive shaft 36 adjacent the opposite ends thereof and which is suitably journalled for rotation in spaced bearing blocks 37. The idler sprockets 35 are mounted on idler stub shafts 38 journalled for rotation in mounting bars 40 suitably keyed or otherwise fixedly secured to the upper ends of legs 30. The drive shaft 36 is intermittently rotated by gear-motor assembly 41 suitably mounted on the frame 28.

Each of the drive sprockets 33 and idler sprockets 35 is of the dual type having two rows of laterally spaced teeth to accommodate the laterally spaced drive chains 32a and 32b (FIGS. 6 and 9) of each drive chain assembly 32. As is well known, each chain 32a, 32b, includes the usual series of opposed links 43 connected together by pins 45 to form an endless chain, the openings between opposed links 43 receiving the teeth of the sprockets so as to be driven thereby. In the illustrative embodiment depicted in FIG. 9, the pins 45 also carry rollers 46 supported on guide rails 47 secured to the upper flanges 48 of beams 29.

In addition to the dual drive chains 32a and 32b, each drive chain assembly 32 includes a series of paired angle members 50 (FIGS. 9 and 11) connected at their vertical legs to the pins 45 of both drive chains 32a and 32b for movement therewith. The horizontal portions 51 of angle members 50 support a peg assembly, generally designated 52, comprised of a base member 53 fixedly secured to the angle member portions 51 and supporting a pair of upstanding, rod-like metal pegs 55a and 55b. These pegs 55a and 55b extend upwardly at a slight angle to a true vertical and converge at their upper ends for receiving a common cap 56 (FIG. 8), preferably formed of nylon, to preclude scratching or breakage of the glass surfaces bearing thereagainst during run-in loading of the conveyor 21 and advancement therealong. The use of dual pegs 55a and 55b oriented in a slight inclination to each other offers rigidity and strength, avoiding bending or flexing thereof during use. Because of the precise orientation of these pegs necessary to effect a smooth and easy transfer of articles, as will hereinafter be described, it is important that they resist flexing and/or bending so that their attitudes remain constant during repeated cycling.

Each peg assembly 52 also includes an L-shaped pad, generally designated 57, removably secured, as by an affixed mounting plate 58, to the base member 53 by suitable fasteners 60. The pad 57 is located between pegs 55b and 55a of adjacent peg assemblies 52 for receiving and supporting the lower edges of the paired sheets forming unit W and is formed of a resiliently yieldable plastic material, preferably urethane, for preventing chipping or breakage of the glass sheets when deposited and carried thereon. The pad 57 includes a raised horizontal portion 61 upon which the glass sheets rest, a lower horizontal portion 61a, and an upright portion 62 defining an abutment face 63 just forwardly of peg 55a of the adjacent assembly 52 to avoid engagement of the glass sheets with the latter. A groove 64 is formed in the horizontal portion 61 of pad 57 for receiving peg 55b. The pegs 55a and 55b of each assembly 52 are slightly laterally offset (FIGS. 9 and 11) from each other to accommodate the curvature of the windshield unit W.

The drive chain assembly 32 described above is duplicated along the other side of conveyor frame 28 so that each pair of pegs 55a and 55b is laterally aligned with another pair of pegs 55a and 55b along a line parallel to the shaft 36 and the common axis of shafts 38. Each laterally aligned pair of peg assemblies 52 is spaced longitudinally from the adjacent pair of peg assemblies 52 sufficiently to supportively receive and readily accommodate a curved windshield unit W therebetween and the pad assembly 57 associated with each adjacent pair of peg asemblies 52 spans the space existing therebetween to provide a resiliently yieldable support for the bottom edges of the paired sheets forming the unit W. The peg conveyor 21 is intermittently driven or indexed and temporarily halted at regular, precise intervals to present successive open spaces between successive pairs of laterally aligned peg assemblies 52 to receive individual units W from delivery conveyor 22 and advance the same step by step along the conveyor 21. To this end, motor 42 is braked or deenergized to interrupt movement of the drive chain assemblies 32 at precise intervals each time an open space between successive peg assemblies 52 is presented to the trailing end of conveyor 22. At least one limit switch LS-1, mounted on base frame 28 adjacent the trailing end of conveyor 22, is positioned in the path of movement of an oncoming windshield unit W. The leading edge of an advancing unit engages the switch LS-1 to complete a circuit energizing motor 42 to index the drive chain assemblies 32 a distance presenting the next open space to conveyor 22. An encoder 65, mounted on base frame 28 and operatively connected to drive shaft 36, records each unit W received on peg conveyor 21. When a predetermined number of units W has been accumulated on conveyor 21, the encoder 65 becomes operative to generate a signal stopping delivery conveyor 22 and controlling motor 42 to shift or index the peg conveyor 21 rearwardly to a given position, as determined by another limit switch (not shown) for example, whereat the conveyor 21 is stopped at the desired position to enable the rack 23 to subsequently lift all the units W off conveyor 21. It should be appreciated that the units W must be precisely located on conveyor 21 relative to the underlying rack 23 in order to effect the above transfer and then, even the slightest misalignment, such as might be caused by drive chain wear and the like, could interfere with the proper conveyor-to-rack transfer.

Figure 10:
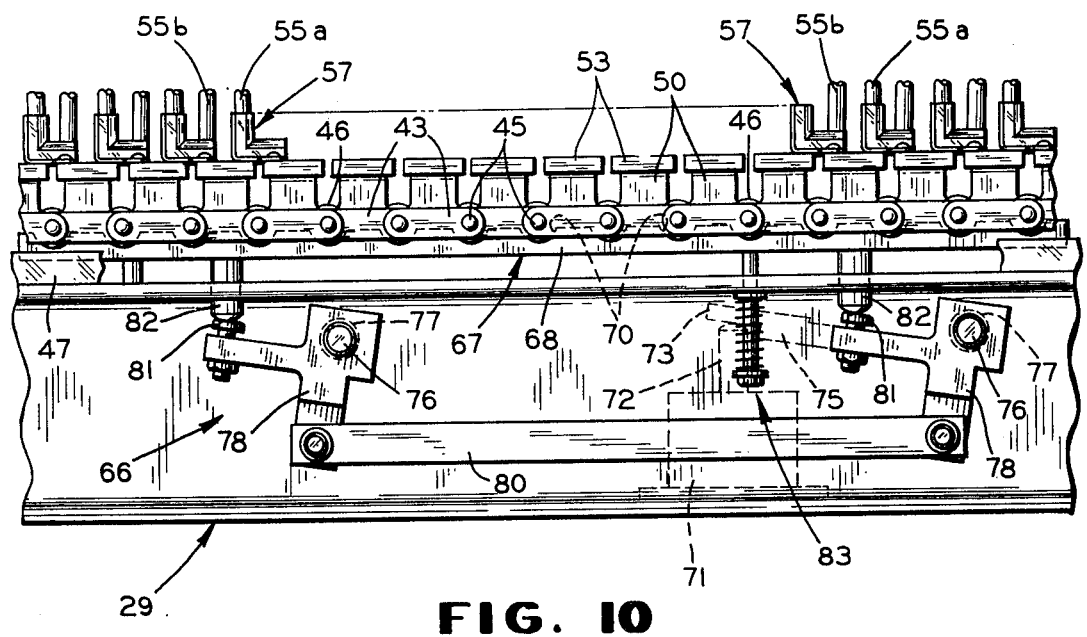
FIG. 10 is a fragmentary, side elevational view, looking in the direction of arrows 10—10 of FIG. 9 or at the inner face of one side of the accumulating transfer conveyor.
Figure 11:
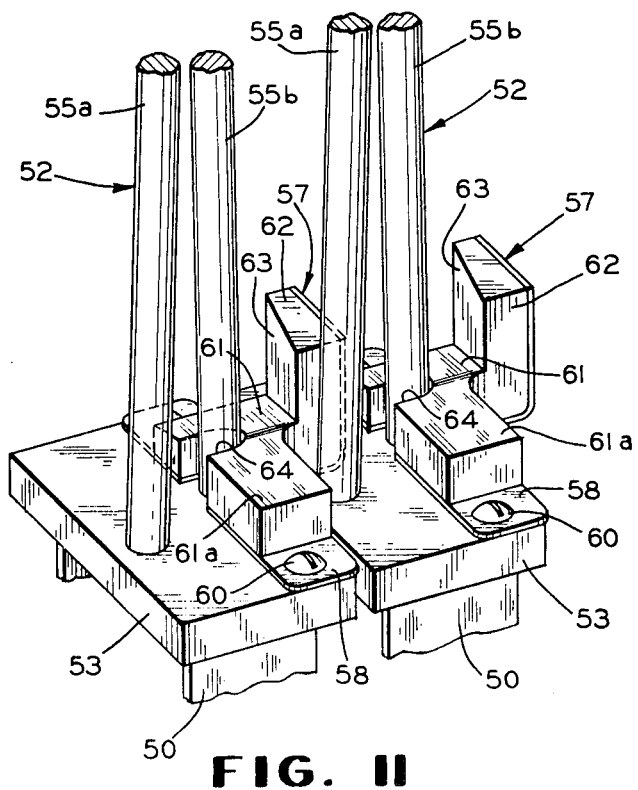
FIG. 11 is a fragmentary, perspective view of a pair of upright peg assemblies mounted on the conveyor drive chain.
Figure 12:
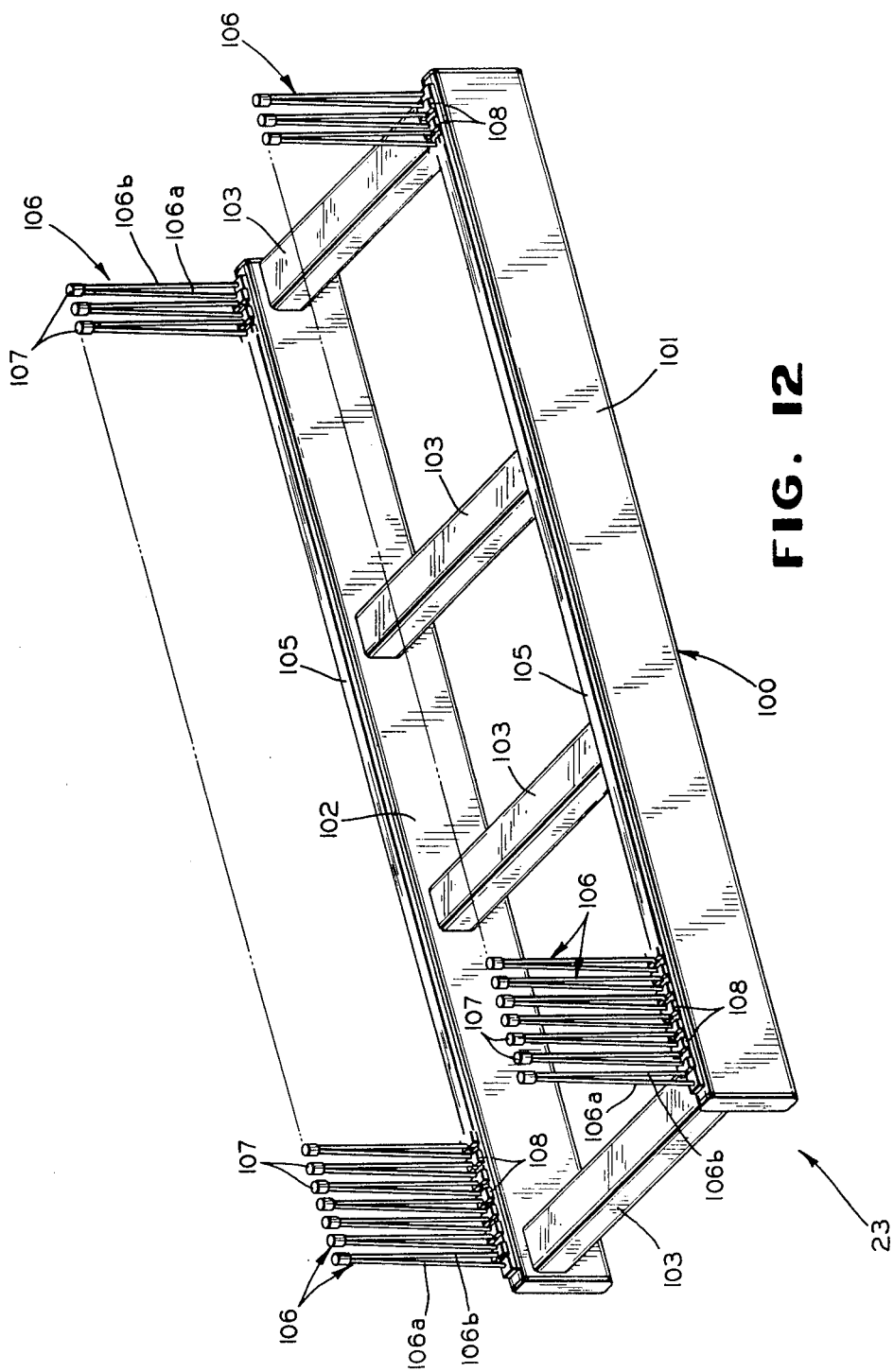
FIG. 12 is a perspective view of a storage rack constructed in accordance with this invention and used in conjunction therewith.

In order to assure accurate disposition of the units W on conveyor 21 relative to rack 23 upon elevation of the same, a plurality of drive chain centering assemblies 66 are provided along opposite sides of the conveyor to locate the respective drive chain assemblies 32 and thereby peg assemblies 52 in the same identical position after each conveyor shifting operation. In order to avoid confusion, the term "shifting", as used in this description, refers only to the movement of the conveyor 21 upon the accumulation of a predetermined number of units W thereon as opposed to the intermittent movement (indexing) of the conveyor in presenting successive open spaces between peg assemblies 52 for receiving individual units W thereon. As best shown in FIGS. 8-10, each centering assembly 66 comprises a centering rack 67 disposed beneath the associated drive chain assembly 32 and extending lengthwise thereof. The rack 67 includes a pair of side rails 68, each having longitudinally spaced, arcuate, semi-circular grooves 70 complementary to the circumferential configuration of rollers 46. The rack 67 is adapted to be raised upwardly with the grooves 70 engaging about rollers 46 to accurately position chain drive assembly 32 upon completion of the conveyor indexing operation.

The means for raising each centering rack 67 includes an actuating cylinder 71 mounted on the lower flange of beam 29 and having the usual reciprocating piston (not shown) connected to a piston rod 72. The upper end of the piston rod 72 engages an extension 73 forming a part of a lift arm 75 located on the outer side of the beam web and rigidly secured to a pivot pin 76 journalled in a bearing sleeve 77 mounted in the web of beam 29. A bell crank 78, located on the other or inner side of the beam web, also is mounted on the pivot pin 76 for pivotal movement therewith.

This lift arm-bell crank arrangement is also provided at the other end of centering rack 67 and similar reference numerals are used to identify the same parts. The longitudinally spaced bell cranks 78 on the inner side of the beam web are operatively connected together by a link 80 pivotally connected at its opposite ends to the bell cranks 78. The lift arms 75 and bell cranks 78 are provided with actuators 81 in the form of threaded rods and nuts to engage the lower ends of lifter pins 82, respectively, secured at their upper ends to the centering racks 67. Thus, actuation of cylinder 71 to raise piston rod 72 pivots the lift arms 75 and bell cranks 78 in unison to effect raising of the centering rack 67 into engagement with the rollers 46 of the chain drive to precisely orient the same in the desired location for subsequent article transfer from the conveyor 21. A pair of spring-biased devices 83 are provided on the rack 67 for returning the same to its lower position upon retraction of the piston rod 72 after completion of the chain centering operation.

In the illustrative embodiment depicted in the drawings, three such chain centering assemblies 66 are utilized on each side of the peg conveyor 21 and are located in lateral alignment with the other three assemblies 66. The laterally aligned pairs of assemblies 66 are actuated in succession, starting at the powered end of the conveyor 21 (the left as viewed in FIG. 5), to precisely position the peg assemblies 52 just prior to effecting the transfer of the accumulated units W from conveyor 21 onto rack 23.

Figure 5:
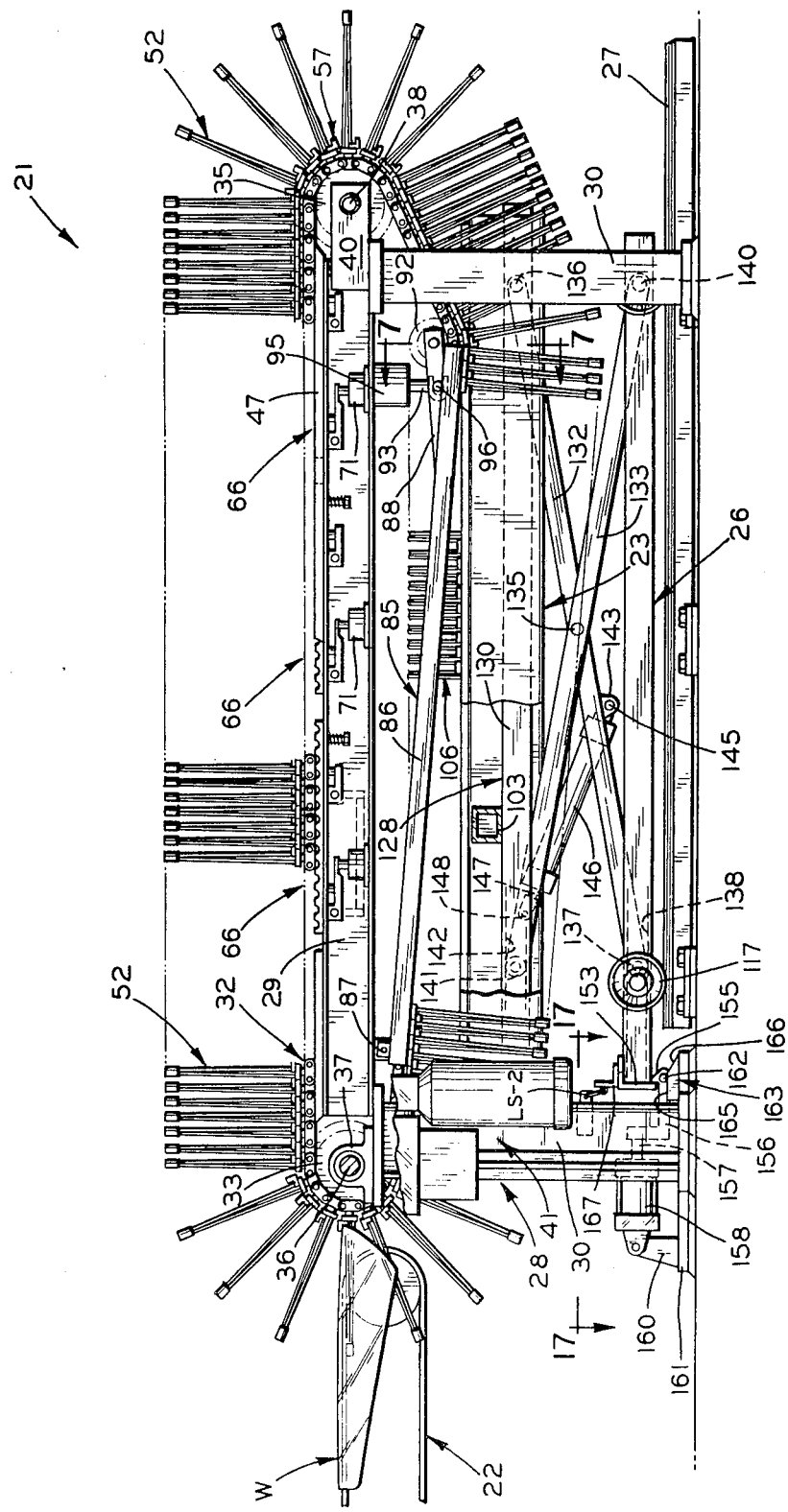
FIG. 5 is a side elevational view of the material handling apparatus constructed in accordance with this invention.

Means are provided for relaxing the chain drive assemblies 32 prior to centering the same. As shown in FIGS. 5 and 7, such means include a pivotal lift frame 85 at each side of conveyor 21 and which is comprised of a pair of elongated angle members 86 pivotally mounted, as at 87 in FIG. 5, to the underside of beam 29 and which carry at their other ends a pair of support arms 88, respectively, welded or otherwise fixedly secured to the frame angle members 86. The arms 88 support stub shafts 90 on which is mounted a double take-up sprocket 91 having laterally spaced sprockets 91a and 91b connected together by a common hub 92 therebetween and engageable with the drive chains 32a and 32b, respectively, of the drive chain assembly 32. An extensible piston rod 93 of an actuating cylinder 95 secured to the underside of beam 29 is connected to a transverse pin 96 extending between and connected to the support arms 88. The piston rod 93 normally is extended to urge sprocket 91 against the drive chain and thereby apply tension thereto. However, just prior to raising chain centering racks 67 into engagement with the rollers 46 of the drive chain assemblies 32, the piston rod 93 is retracted to provide sufficient slack in the drive chain for slight movement thereof when engaged by the racks 67.

A significant feature of this invention resides in the use of storage rack 23, which not only supports a plurality of sheets for storage or transport from one place to another, but also is employed in stripping and depositing an accumulated series of sheets off and onto a conveyor system. The rack 23 includes a frame 100 comprised of a pair of elongated side members 101 and 102 of generally rectangular, hollow shape in cross section and a series of structural cross members 103 also of generally rectangular, hollow shape in cross section extending between and connected at their opposite ends to side members 101 and 102. Elongated supports 105 are welded or otherwise fixedly secured to the upper surfaces of side members 101 and 102.

Each of the elongated supports 105 has rigidly mounted to the top surface thereof a longitudinal row of spaced, upright peg assemblies 106. Each assembly 106 comprises a pair of rod-like pegs 106a and 106b extending upwardly at a slight angle to a true vertical and converging at their upper ends for receiving a common cap 107, preferably formed of nylon or any other suitable resiliently yieldable, elastomeric material to protect the surfaces of the glass sheets during the loading and unloading thereof onto and off the rack 23. The peg assemblies 106 of each elongated support 105 are laterally aligned with the peg assemblies 106 of the other support 105 and the longitudinal spacing between adjacent laterally aligned sets of peg assemblies 106 is sufficient to supportively receive the greatest curvature of windshield unit W expected to be handled.

Figure 16:
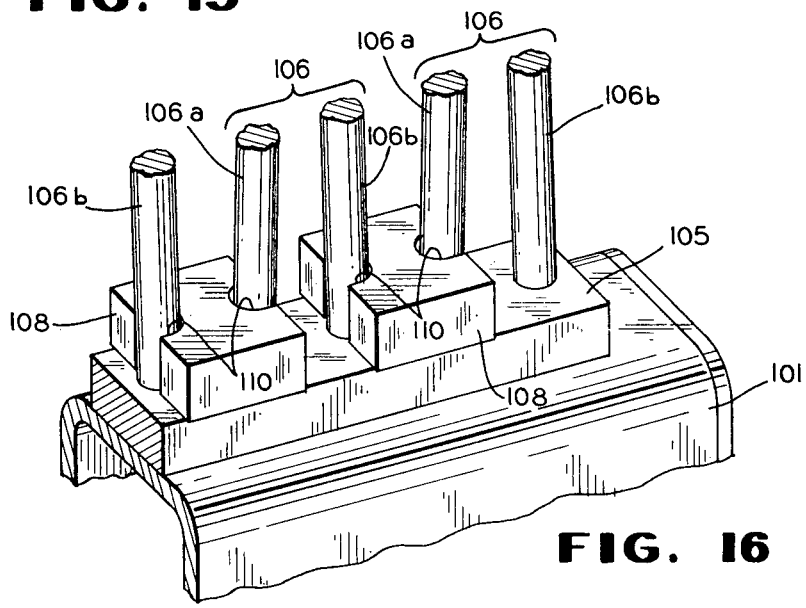
FIG. 16 is an enlarged, fragmentary, perspective view of the peg arrangement mounted on the rack of FIG. 12.

As best shown in FIG. 16, a pad 103 is mounted on the elongated support 105 between each peg 106b and 106a of longitudinally adjacent peg assemblies 106 for receiving and supporting the lower edges of the glass sheets and is formed of resiliently yieldable plastic material, preferably urethane, for preventing chipping and breakage of the sheets, as well as providing a friction surface to avoid longitudinal or lateral slipping of the sheets thereon during transport. Each pad 108 is formed with opposite semi-circular grooves 110 for accommodating the lower ends of pegs 106b and 106a of adjacent peg assemblies 106.

As earlier mentioned, a mobile lift apparatus 26 is employed to carry the rack 23 for movement in both a horizontal and vertical direction for effecting the transfer of units W from conveyor 21 onto the rack 23. As best shown in FIG. 5 and FIGS. 13-15, the lift apparatus 26 comprises a generally rectangular base frame 111 formed of suitable longitudinally and transversely extending structural members 112 and 113, respectively. The frame 111 is provided with a pair of drive wheels 115 mounted adjacent the ends of a drive shaft 116 journalled for rotation in the longitudinal structural members 112. Also, a pair of idler wheels 117 are mounted on a shaft 118 suitably mounted on the side members 112. One wheel of each pair has a peripheral V-groove 120 adapted to ride on the inverted V-shaped track 27 while the other wheel of each pair has an annular surface adapted to roll on a flat surface rail 121 (FIG. 15). The means for rotating drive shaft 116 includes an electric motor 122 having an output shaft 123 suitably connected, as by a chain and sprocket arrangement 125, to a gear reduction box 126, in turn connected via sprocket and chain arrangement 127 to the drive shaft 116.

The apparatus 26 includes a lift platform 128 having side members 130 and end members 131 to form a rectangular structure for supporting a rack 23. The lift platform 128 is supported from the base frame 111 by two pairs of scissor links 132 and 133, respectively, at opposite ends of the apparatus 26. The links of each pair are pivoted centrally on a pivot pin 135. The upper ends of the links 132 are pivotally mounted, as at 136 in FIG. 5, on the sides of platform 128 adjacent one end thereof while the lower ends of links 132 carry rollers 137 which run in trackways 138 along the sides of the base frame 111. The lower ends of the links 133 are pivotally mounted, as at 140 in FIG. 5, on the sides of base frame 111 adjacent one end thereof and the upper ends of links 133 carry rollers 141 guided in trackways 142 along the sides of the lift platform 128.

Lugs 143 are mounted on the lower halves of the laterally spaced scissor links 132 to support a pivot shaft 145 to which is connected the head end of an actuating cylinder 146. The piston rod 147 of cylinder 146 is pivotally mounted on a pivot shaft 148 connected at its opposite ends to the upper halves of scissor links 133. Accordingly, extension and retraction of the piston rod 147 is effective to swing the links 133 upwardly and downwardly to raise and lower the lift platform 128.

Figure 17:
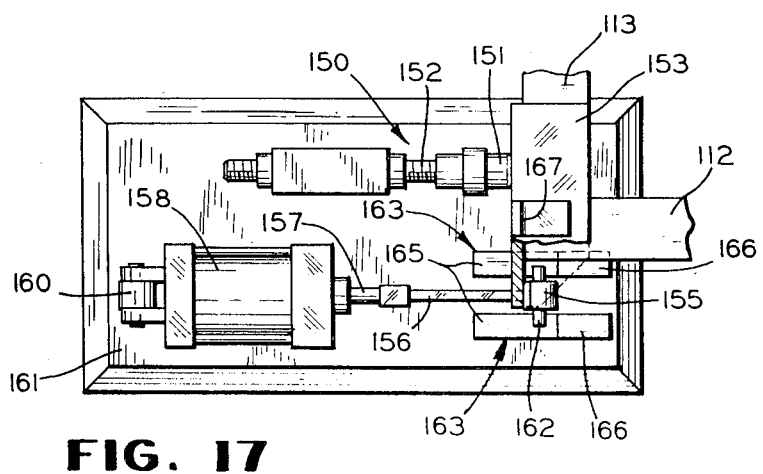
FIG. 17 is a horizontal sectional view, on an enlarged scale, taken along line 17—17 of FIG. 5.

As earlier explained, the mobile lift apparatus 26 is operative to carry an empty rack 23 beneath the accumulating transfer conveyor 21 and raise the rack to lift a plurality of windshield units W off conveyor 21. In order to assure proper positioning of the rack 23 to effect this transfer, means are provided to accurately orient the rack 23 relative to conveyor 21. As best shown in FIGS. 5 and 17, such means comprises an adjustable locator stop 150 having an abutment pad 151 attached to the distal end of a threaded rod 152. The pad 151 is adapted to be engaged by an inverted L-shaped bumper 153 rigidly secured onto the leading transverse member 113 of frame 111.

In order to maintain the lift apparatus 26 in the desired position, the bumper 153 projects below and laterally outwardly of lift frame 111 for engagement by a hook 155 forming a part of an L-shaped bracket 156 attached to the distal end of a piston rod 157 of an actuating cylinder 158. Cylinder 158 is pivotally mounted at its head end on an upstanding lug 160 extending upwardly from a support base 161. The hook 155 is provided with a pin 162 projecting laterally from the opposite sides thereof and adapted to ride on guides 163. Each guide 163 has a straight planar surface 165 and an inclined surface 166. The piston rod 157 is normally extended with the pin 162 resting on surfaces 166, so that hook 155 is in a lowered, out-of-the-way position. As the lift frame 111 approaches the end of its travel beneath conveyor 21, an L-shaped actuator 167 mounted on bumper 153 engages a limit switch LS-2 to complete an electrical circuit (not shown) controlling operation of cylinder 158. The piston rod 157 and thereby hook 155 is retracted, moving the latter upwardly and inwardly toward the bumper 153 until it engages therebehind to press and lock the lift apparatus 26 against stop pad 151, thereby positioning rack 23 in the desired location relative to transfer conveyor 21.

Figure 13:
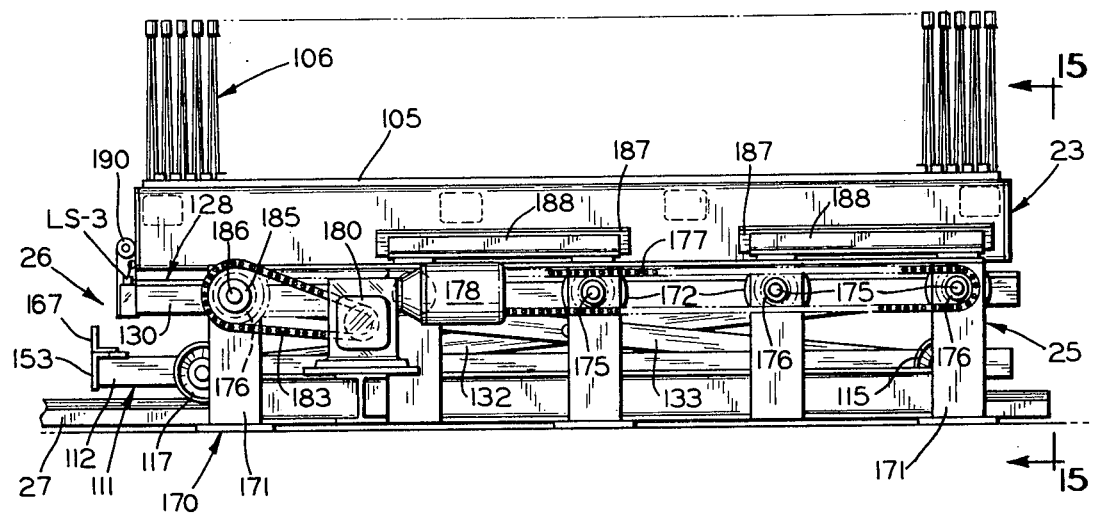
FIG. 13 is a side elevational view of the rack of this invention shown supported on a mobile lift apparatus, also constructed in accordance with this invention.
Figure 14:
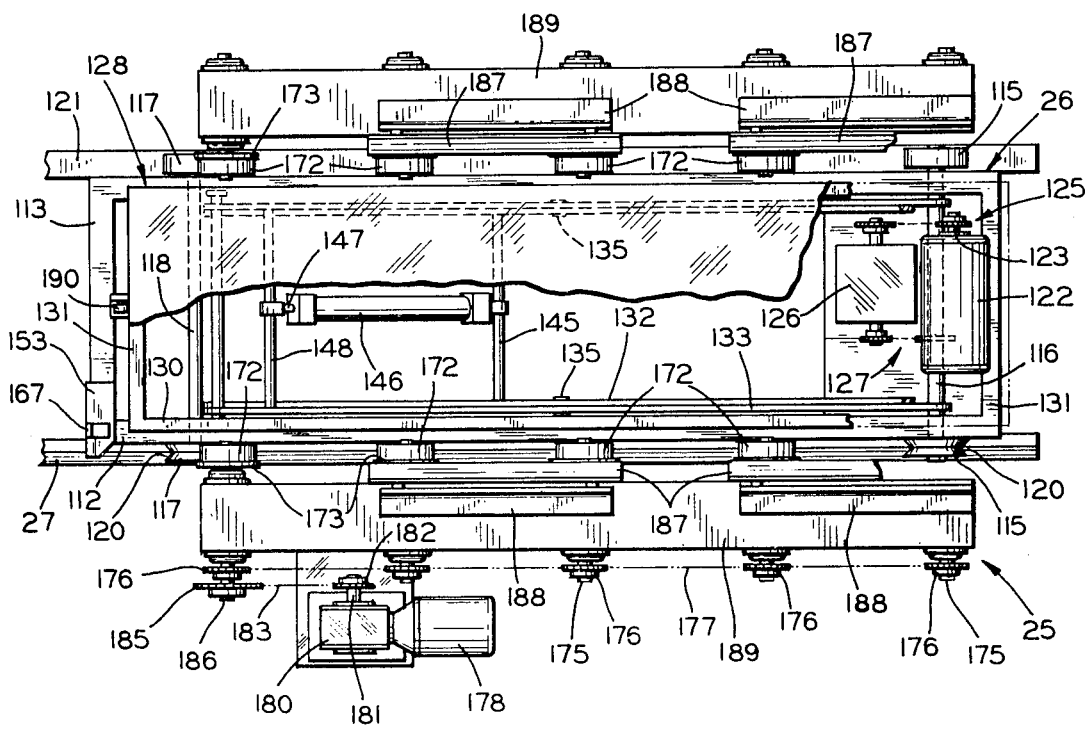
FIG. 14 is a top plan view of the rack and mobile lift apparatus of FIG. 12, with portions thereof broken away for the sake of clarity.
Figure 15:
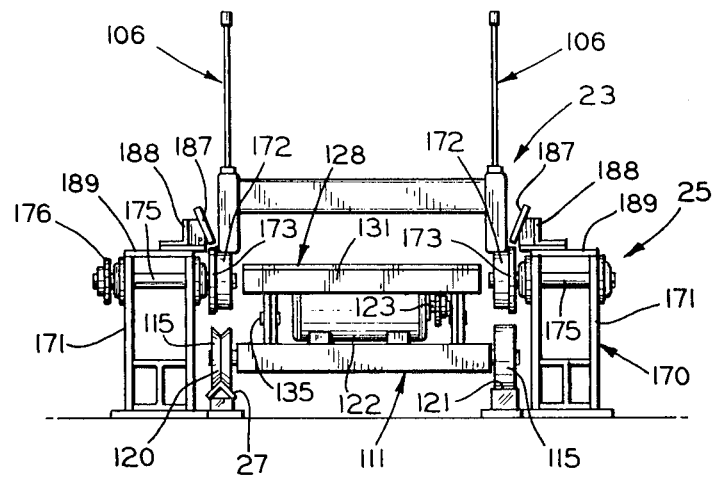
FIG. 15 is an end elevational view of the rack and mobile lift assembly of FIG. 13, looking in the direction of arrows 15—15 of FIG. 13.

As best shown in FIGS. 13-15, the run-in conveyor 25 is utilized to deliver racks 23 one at a time to the mobile lift apparatus 26. Conveyor 25 includes a frame 170 comprised of a plurality of laterally spaced-apart and aligned columns 171 adapted to support conveyor wheels 172 thereon. Each of the wheels 172 is formed with a peripheral flange 173 and is mounted on the inner end of a shaft 175 suitably journalled for rotation on the associated column 171. Pinions 176, driven by an endless drive chain 177, are rigidly secured onto the other or outer ends of one row of drive shafts 175. This drive chain 177 is entrained about all the pinions 176 of the several wheels 172 along one side of the conveyor 25 for rotating the same in unison at the same speed to convey racks 23 thereon. The wheels 172 along the other side of the conveyor 25 are idler wheels.

The drive for chain 177 includes an electric motor 178 connected to a suitable source of electrical power (not shown). The motor is connected, via gear reduction box 180, to an output shaft 181 having a drive sprocket 182 secured thereon. A drive chain 183 is entrained about drive sprocket 182 and a driven sprocket 185 rigidly mounted on a drive extension 186 formed on one of the drive shafts 175.

The racks 23 are guided in their vertical movement by angled guide plates 187 welded or otherwise fixedly secured to brackets 188 mounted on plates 189 supported on the columns 171. As shown in FIG. 15, the outside lateral dimension of each rack 23 is just slightly smaller than the distance between opposed flanges 173 of laterally aligned wheels 172 and the lower ends of the angled guide plates 187.

The run-in conveyor 25 is operated to deliver a rack 23 to a position slightly above the lift platform 128 of mobile lift apparatus 26 when in its collapsed position. The advancing rack 23 engages a roller stop 190 to accurately position the rack 23 relative to the underlying lift platform 128. At the same time, the leading end of the rack 23 engages and actuates a limit switch LS-3 to close a circuit controlling operation of actuating cylinder 146 to extend piston rod 147 and raise lift platform 128. The platform 128 moves upwardly between side members 101 of the rack 23 into engagement with the underside thereof to lift rack 23 upwardly off conveyor wheels 172. The apparatus 26 is then moved longitudinally on tracks 27 into its predetermined position beneath accumulating transfer conveyor 21 to effect the article transfer.

The mode of operation of the sheet handling apparatus 20 of this invention is as follows:

Paired bent glass sheets forming the windshield unit W are delivered at spaced intervals from a glass processing station, such as a bending furnace for example or any other material handling or processing apparatus, on delivery conveyor 22 to the accumulating transfer conveyor 21. The conveyor 21 is intermittently operated and indexed to move the peg assemblies 52 thereof in a step by step, endless orbital path in a timed cyclic relation with conveyor 22 for presenting a free open space between adjacent pairs of laterally aligned peg assemblies 52 at the discharge end of delivery conveyor 22. The conveyor 22 advances the unit W horizontally into such space and onto a pair of now horizontally extending, laterally spaced peg assemblies 52. When the leading edge of the unit W engages the switch LS-1, motor 42 is energized to drive conveyor 21 and these movable peg assemblies, in the course of their orbital travel, swing the unit W upwardly into an upright position. The lower edges of the unit W settle against the pad assemblies 57 while other portions of the unit W rest against caps 56. As the unit W is swung upwardly by the peg assemblies 52, the next succeeding open space therebetween becomes aligned with the trailing end of delivery conveyor 22. The conveyor 21 is then momentarily stopped to receive the next unit W. When a predetermined number of such units have been accumulated on peg conveyor 21, as determined by encoder 65, the conveyor 21 is shifted rearwardly to a predetermined position and stopped with a pair of laterally aligned drive chain rollers 46 in vertical alignment with the first grooves 70 of the first pair of laterally aligned chain centering assemblies 66.

Upon stoppage of the accumulating transfer conveyor 21, cylinders 95 are actuated to retract their respective piston rods 93 and thereby remove the bias on the drive chain assemblies 32 along both sides of the conveyor to provide slack therein. Thereupon, the several pairs of cylinders 71 are sequentially operated to raise the three pairs of centering racks 67 in succession into engagement with rollers 46 of the drive chain assemblies 32. This precisely orients the peg assemblies 52 and thereby the windshield units W in the exact location required for subsequent removal by rack 23.

In the meantime, mobile lift apparatus 26 is positioned beneath run-in conveyor 25 with the lift platform 128 in its lowermost position. An empty rack 23, deposited or otherwise conveyed to run-in conveyor 25, is advanced by wheels 172 until the leading end of rack 23 engages roller stop 190 and limit switch LS-3. Actuation of switch LS-3 closes a circuit effecting de-energization or braking of motor 178 to stop rotation of conveyor wheels 172. Switch LS-3 also is effective to initiate operation of cylinder 146 to elevate lift platform 128 and raise the rack 23 off wheels 172. Another limit switch (not shown) engageable by the lift platform 128 during upward movement thereof above conveyor wheels 172 terminates upward movement of the lift platform 128 and energizes the circuit controlling operation of motor 122 to advance the mobile lift apparatus 26 on tracks 27 toward accumulating transfer conveyor 21.

Figure 6:
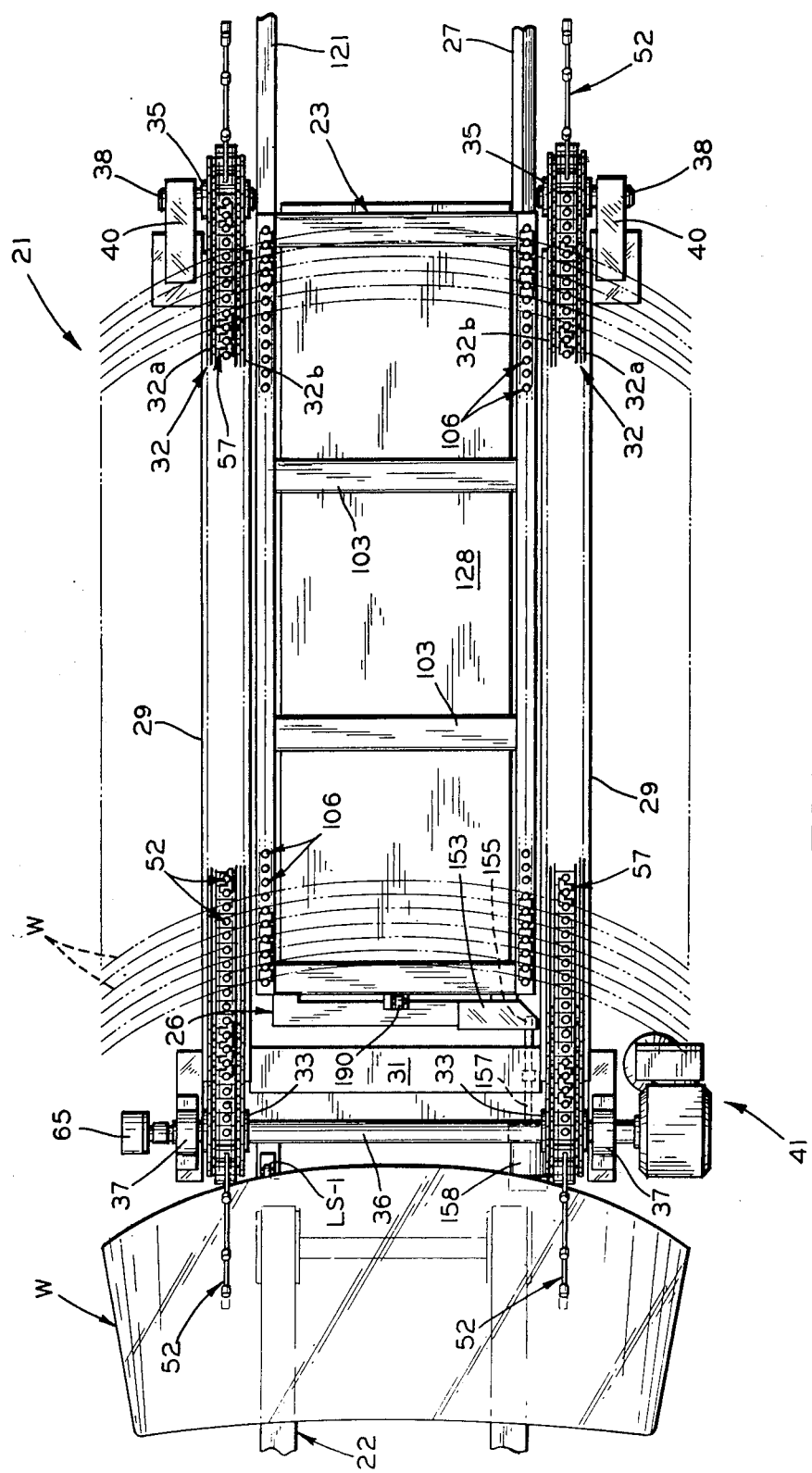
FIG. 6 is a top plan view of the apparatus of FIG. 5.

The mobile lift apparatus 26 moves longitudinally beneath the active run of conveyor 21 and between the laterally spaced rows of peg assemblies 52 until the actuator 167 at the leading end of base frame 111 engages limit switch LS-2. Actuation of switch LS-2 energizes a circuit effecting operation of cylinder 158 to retract piston rod 157 and bring hook 155 into engagement with bumper rod 153 for latching the same against abutment pad 151. Switch LS-2 also energizes a time delay relay which becomes effective to actuate cylinder 146 and raise the lift platform 128 further upwardly. The rack 23 moves upwardly on lift platform 128 between the conveyor frame beams 29, lifting the accumulated windshield units W off conveyor 21 to an elevation thereabove. As best shown in FIG. 6, the laterally aligned paired peg assemblies 126 of rack 23 lie on a transverse line parallel to but offset from a line extending through the laterally aligned peg assemblies 52 of conveyor 21 in order to accommodate the curvature of windshield units W. Thus, precise positioning of the rack 23 relative to conveyor 21, as effected by the chain centering assembly 66 and the latch arrangement 153-155, is important in providing a smooth and efficient transfer of the units W from conveyor 21 to rack 23.

As the lift platform 128 approaches the end of its upstroke above the peg assemblies 52 of conveyor 21, the moving scissor links engage still another limit switch (not shown) to stop upward movement of the lift platform 128 and energize motor 122 to return the mobile lift apparatus 26 to its initial position, whereat the lift platform 128 is lowered below wheels 172 of the run-in conveyor 25 to deposit the glass laden rack 23 thereon for conveyance and/or removal off the run-in conveyor 25. At the same time, motor 42 is activated to drive accumulating transfer conveyor 21 for receiving and accumulating another series of windshield units W and the above-described cycle is repeated.

It should be understood that actuation of the several operating cylinders 71, 81, 95, 146 and 158 is effected by conventional fluid control valves (not shown) properly sequenced for operation by switches LS-1 and LS-2, as well as other conventional limit switches (not shown) and electrical timers forming part of the electric control system (also not shown), which are operated or actuated when predetermined movements of the various movable parts occur. Each of the switches and/or timers triggers the subsequent stage of operation of the control valves and consequent actuation of the several cylinders sequentially. Likewise, energization or braking of the electric motors controlling operation of conveyors 21, 22 and 25, as well as movement of the mobile lift apparatus 26, also are properly sequenced for operation by limit switches (including switch LS-1) and timing arrangements forming part of the electric control system. The manner of positioning and connecting the necessary control switches, timers and fluid control valves is conventional and it is believed that no further description or amplification thereof is necessary.

The mode of operation set forth above described the process of transferring an accumulated series of paired glass sheets from the peg conveyor 21 onto the rack 23. However, it should be appreciated that this procedure can be reversed in order to simultaneously transfer a number of units W from a loaded rack 23 onto a conveyor 21. When the conveyor 21 is employed to receive a plurality of units W from a loaded rack, the mounting of the pads 57 on conveyor 21 is changed to dispose the upright portions 62 thereof just slightly behind the glass engaging faces of the associated pegs 55a to avoid engagement or interference of the glass lower edges with such portions. This is the only change required to effect a reversal of the detailed procedure outlined above. Thus, the material handling apparatus 20 of this invention can be utilized to employ an empty rack for stripping articles from a conveyor or for depositing articles from a loaded rack onto a conveyor, as desired. Moreover, the apparatus 20 is in no way restricted in use to paired sheets of glass or even to glass sheets, but has utility in any material handling operation involving the transfer of somewhat rigid sheet material.

From the foregoing, it is apparent that the objects of the present invention have been fully accomplished. A new and useful material handling apparatus is provided for rapidly and smoothly transferring a plurality of sheets of material simultaneously from a peg conveyor onto a novel storage rack or from such storage rack onto a conveyor or other article support system. The conveyor and rack are provided with specially constructed peg arrangements for accommodating the plurality of sheets in a spaced, generally upright position. A mobile lift apparatus is provided for moving the rack relative to the conveyor for effecting the article transfer with the precision required in a fully automated, mass production operation.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

We claim:

1. A rack especially adapted for supporting a plurality of curved glass sheets in a spaced, upright attitude comprising: a frame including a pair of longitudinally extending structural members disposed in spaced parallel relation to each other and transversely extending cross members connecting said longitudinal members together; support members affixed to the upper surfaces of said longitudinal members, respectively, and extending lengthwise thereof; a first row of longitudinally spaced peg assemblies rigidly secured to one of said support members; a second row of longitudinally spaced peg assemblies rigidly secured to the other of said support members; each of said peg assemblies comprising a pair of pegs extending upwardly from the associated support member at a slight angle relative to a true vertical in converging relation toward each other; and a pad formed of resiliently yieldable material affixed to said support member between each adjacent pair of peg assemblies.

2. A rack according to claim 1, including a cap covering the abutting distal ends of said pegs.

3. A rack according to claim 2 wherein said cap is formed of a resiliently yieldable elastomeric material.

4. A rack according to claim 1 wherein said pad is formed with opposite grooves for receiving the lower ends of opposed pegs of adjacent peg assemblies, respectively.

5. A rack according to claim 1, wherein said peg assemblies of said first row are in lateral alignment with the peg assemblies of said second row.

* * * * *